US 6,731,830 B2

United States Patent
Lauder et al.

(10) Patent No.: US 6,731,830 B2
(45) Date of Patent: May 4, 2004

(54) ASYMMETRIC COMPATIBLE NETWORK ELEMENT

(75) Inventors: Richard Lauder, Maroubra (AU); Ross Halgren, Collaroy Plateau (AU)

(73) Assignees: Redfern Broadband Networks, Inc., Wilmington, DE (US); Redfern Broadband Networks Pty Ltd., Eveleigh (AU)

( * ) Notice: Subject to any disclaimer, the term of this patent is extended or adjusted under 35 U.S.C. 154(b) by 243 days.

(21) Appl. No.: 09/755,886

(22) Filed: Jan. 5, 2001

(65) Prior Publication Data

US 2002/0090166 A1 Jul. 11, 2002

(51) Int. Cl.$^7$ .............................. G02B 6/26; H04J 14/02
(52) U.S. Cl. ..................... 385/16; 385/24; 385/135; 398/41; 398/49; 398/79; 398/83
(58) Field of Search .............................. 385/24, 16, 14, 385/37, 135, 136, 137; 359/124, 127, 130, 125, 128; 398/41, 49, 50, 79, 83, 55

(56) References Cited

U.S. PATENT DOCUMENTS

| 4,112,293 A | * | 9/1978 | Kach .......................... 359/166 |
| 4,528,695 A | * | 7/1985 | Khoe .......................... 359/167 |
| 4,987,591 A | | 1/1991 | Ohtsuka |
| 5,027,344 A | | 6/1991 | Bellamy et al. |
| 5,390,164 A | | 2/1995 | Kremer |
| 5,394,389 A | | 2/1995 | Kremer |
| 5,406,549 A | | 4/1995 | Kremer |
| 5,442,622 A | | 8/1995 | Hokari |
| 5,550,818 A | | 8/1996 | Brackett et al. |
| 5,757,793 A | | 5/1998 | Read et al. |
| 5,808,763 A | | 9/1998 | Duck et al. |
| 5,812,289 A | | 9/1998 | Tomooka et al. |
| 5,880,864 A | | 3/1999 | Williams et al. |
| 5,930,016 A | * | 7/1999 | Brorson et al. .............. 359/127 |
| 5,943,149 A | | 8/1999 | Cearns et al. |
| 5,953,141 A | | 9/1999 | Liu et al. |

(List continued on next page.)

FOREIGN PATENT DOCUMENTS

| EP | 0 110 388 A1 | 6/1984 |
| EP | 0 759 681 A3 | 2/1997 |
| EP | 0 924 901 A2 | 6/1999 |
| EP | 1 005 188 A2 | 5/2000 |
| EP | 1 009 112 A2 | 6/2000 |
| EP | 1 039 773 A2 | 9/2000 |
| EP | 1 052 795 A2 | 11/2000 |
| EP | 1 063 803 A1 | 12/2000 |
| EP | 1 069 719 A2 | 1/2001 |
| EP | 1 069 720 A2 | 1/2001 |
| EP | 0 975 105 A3 | 3/2001 |
| GB | 2 329 291 A | 3/1999 |
| GB | 2 346 280 A | 8/2000 |
| WO | WO 98/52306 | 11/1998 |
| WO | WO 99/13656 | 3/1999 |
| WO | WO 99/65164 | 12/1999 |
| WO | WO 00/64087 | 10/2000 |
| WO | WO 01/47159 A1 | 6/2001 |

Primary Examiner—Hemang Sanghavi
(74) Attorney, Agent, or Firm—Christie, Parker & Hale, LLP

(57) ABSTRACT

An optical network element comprising a plurality of subscriber line connections, a WDM unit having a plurality of WDM channel connections, a plurality of subscriber line interface cards and a plurality of trunk line interface cards for optical interfacing between the subscriber line connections and the WDM channel connections, and a switch arranged, in use, in a manner such as to be capable of switching transmission directions between the WDM channel connections and individual ones of the subscriber line connections by suitable switching of an optical path configuration between transmitter ports and receiver ports of the subscriber line interface cards and the WDM channel connections.

13 Claims, 2 Drawing Sheets

U.S. PATENT DOCUMENTS

| | | |
|---|---|---|
| 5,959,749 A | 9/1999 | Danagher et al. |
| 5,978,114 A | 11/1999 | Clark et al. |
| 6,084,694 A * | 7/2000 | Milton et al. ............... 359/124 |
| 6,091,734 A | 7/2000 | Suzuki et al. |
| 6,101,204 A | 8/2000 | Johnston, Jr. |
| 6,236,499 B1 * | 5/2001 | Berg et al. ............... 359/341.2 |
| 6,272,154 B1 | 8/2001 | Bala et al. |
| 6,333,799 B1 | 12/2001 | Bala et al. |
| 6,493,117 B1 | 12/2002 | Milton et al. |
| 6,512,614 B1 | 1/2003 | Saleh et al. |
| 6,519,060 B1 | 2/2003 | Liu |
| 6,519,064 B1 | 2/2003 | Fatehi et al. |
| 6,525,852 B1 | 2/2003 | Egnell |
| 6,556,352 B2 | 4/2003 | Wang et al. |
| 2001/0015839 A1 | 8/2001 | Koh et al. |
| 2002/0030867 A1 * | 3/2002 | Iannone et al. ............. 359/124 |
| 2002/0118411 A1 * | 8/2002 | Cooney et al. ............. 359/113 |
| 2002/0118417 A1 | 8/2002 | Barry et al. |
| 2002/0131692 A1 * | 9/2002 | Chen et al. ................. 385/24 |

* cited by examiner

_(1)_

ASYMMETRIC COMPATIBLE NETWORK ELEMENT

FIELD OF THE INVENTION

The present invention relates broadly to an optical network element.

BACKGROUND OF THE INVENTION

Existing optical networks incorporating Wavelength Division Multiplexer (WDM) technology have been designed symmetrically, i.e. with provision of the same amount of bandwidth in either transmission direction between network elements.

The main reason for this is that those optical networks were designed for voice communication, which is symmetric by nature. In other words, there is no requirement in voice communication to "favour" one transmission direction over the other through provision of asymmetric bandwidth allocation.

Typically, those symmetric optical networks incorporate separate optical fibre connections for each transmission direction. Alternatively two separate bands are allocated on one optical fibre for the respective transmission directions.

However, in optical networks that are to be utilised for data communication as opposed to primarily voice communication, the nature of the data traffic requirements is typically asymmetric. For example, the communication traffic between a computer connected to the Internet (particularly for private use) is such that a vast amount of data is transmitted to that particular computer, whereas data transmission from the computer into the Internet is typically minimal. In this scenario, utilisation of a symmetric optical network is inefficient, as it represents a wasteful use of optical fibre and/or bandwidth resources.

In at least preferred embodiments, the present invention seeks to provide an optical network element which is compatible with asymmetric communication requirements.

SUMMARY OF THE INVENTION

In accordance with a first aspect of the present invention there is provided an optical network element comprising a plurality of subscriber line connections, a WDM unit having a plurality of WDM channel connections, a plurality of subscriber line interface cards and a plurality of trunk line interface cards for optical interfacing between the subscriber line connections and the WDM channel connections, and a switch arranged, in use, in a manner such as to be capable of switching transmission directions between the WDM channel connections and individual ones of the subscriber line connections by suitable switching of an optical path configuration between transmitter ports and receiver ports of the subscriber line interface cards and the WDM channel connections.

Pairs of one subscriber line interface card and one trunk line interface card may be implemented on a single card.

Preferably, the switch is disposed between transmitter and receiver ports of the trunk line interface cards on the WDM side thereof and the WDM channel connections and is arranged in a manner such that, in use, the transmission directions are switched by suitable switching of the connectivity between said transmitter and receiver ports of the trunk line interface cards and the WDM channel connections.

The switch may comprise an optical patch panel arranged, in use, to manually switch said connectivity.

Alternatively, the switch may be automated. The automated switch is preferably an automated optical switch.

In accordance with a second aspect of the present invention, there is provided an optical network element comprising a plurality of full-duplex subscriber line connections and a WDM unit having a plurality of WDM channel connections, the network element being arranged in a manner such that only active transmission direction channels of the full-duplex subscriber line connections are, in use, connected to the WDM channel connections.

In accordance with a third aspect of the present invention there is provided an optical network element comprising a plurality of subscriber line connections and a WDM unit having a plurality of WDM channel connections, the network element being arranged in a manner such that, in use, a transmission direction with respect to transmissions to and from the subscriber line connections is wavelength independent.

In accordance with a fourth aspect of the present invention there is provided an optical network having a plurality of subscriber line connections, the network being arranged in a manner such that, in use, a transmission direction with respect to transmissions to and from the subscriber line connections is wavelength independent.

Preferably, the optical network incorporates an optical network element in accordance with the third aspect of the present invention.

In accordance with a fifth aspect of the present invention there is provided a method of switching transmission directions between WDM channel connections and individual ones of a plurality of subscriber line connections of an optical network element, the method comprising the step of switching an optical path configuration between transmitter ports and receiver ports of subscriber line interface cards of the network element and the WDM channel connections.

BRIEF DESCRIPTION OF THE DRAWINGS

Preferred forms of the present invention will now be described, by way of example only, with reference to the accompanying drawings.

DETAILED DESCRIPTION OF THE EMBODIMENTS

Figure 1:
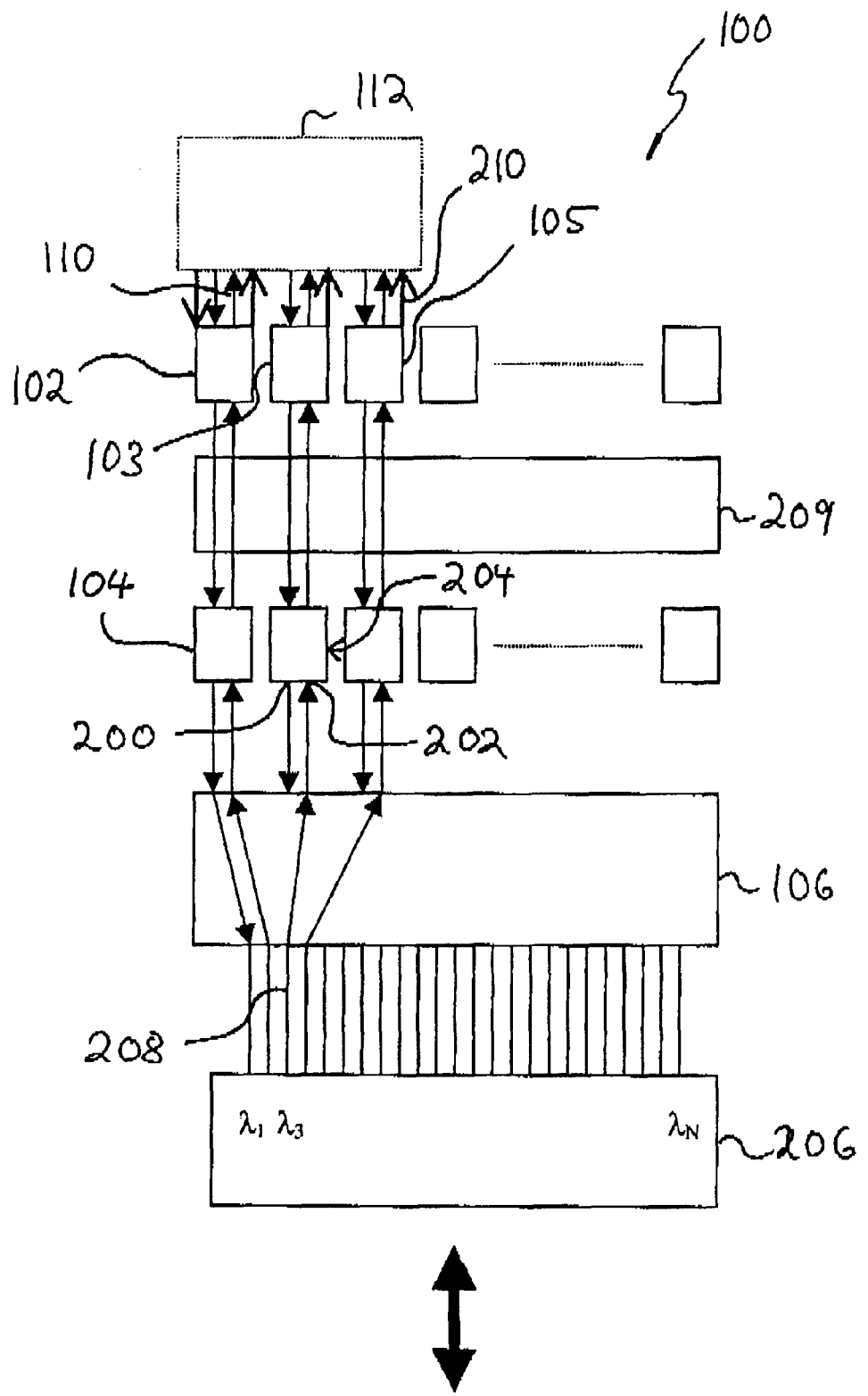
FIG. 1 is a schematic diagram illustrating a network element embodying the present invention.

In FIG. 1, a network element 100 comprises a plurality of line interface cards eg 102 and a plurality of trunk interface cards, eg 104 and a WDM unit 206. Interconnection between the line interface cards e.g. 102 and the trunk interface cards e.g. 104 is in this embodiment effected through a switch unit 209.

The WDM unit 206 is of a type in which each of optical inputs and outputs e.g. 208 filters a particular wavelength ($\lambda 1$ to $\lambda N$). In the exemplary embodiment the WDM unit 206 comprises an arrayed waveguide grating (AWG).

The network element further comprises a channel switch in the form of an optical patch panel 106. A plurality of line connections e.g. 110 to subscribers is also provided. In the example shown in FIG. 1, each subscriber is connected to the network element 100 through subscriber units e.g. 112. The subscriber unit 112 in this exemplary embodiment has three full-duplex point-to-point connections to the network element 100 by way of three subscriber line cards 102, 103 and 105.

To provide a subscriber with an asymmetric communication configuration, only one of the full-duplex connections is utilised with both directions active, in the exemplary embodiment the full-duplex connection effected through line interface card 102. Both full-duplex connections by way of line interface cards 103 and 105 have one direction not active, namely the direction from the subscriber to the network element 100. Accordingly, the subscriber is provided with an asymmetric communication configuration. Active communication directions are indicated by the larger arrows e.g. 210 in FIG. 1.

Importantly, it will be appreciated by a person skilled in the art that through provision of the channel switch 106, the fact that connections are inactive does not result in waste of WDM resources. Rather, through suitable switching of the connectivity between transmitters ports e.g. 200 and receiver ports e.g. 202 of the trunk line interface cards e.g. 204, the network element 100 can be configured in a way such that an inactive communication "channel" is not connected to one of the WDM channel connections e.g. 208, thus saving resources in the WDM network.

The set up as shown in FIG. 1 satisfies asymmetric bandwidth allocation requirements of a particular subscriber connected to subscriber unit 112. However, the network element 100 embodying the present invention can also provide the capability of, if desired, providing a symmetric bandwidth allocation for communication between the subscriber and the network.

Figure 2:
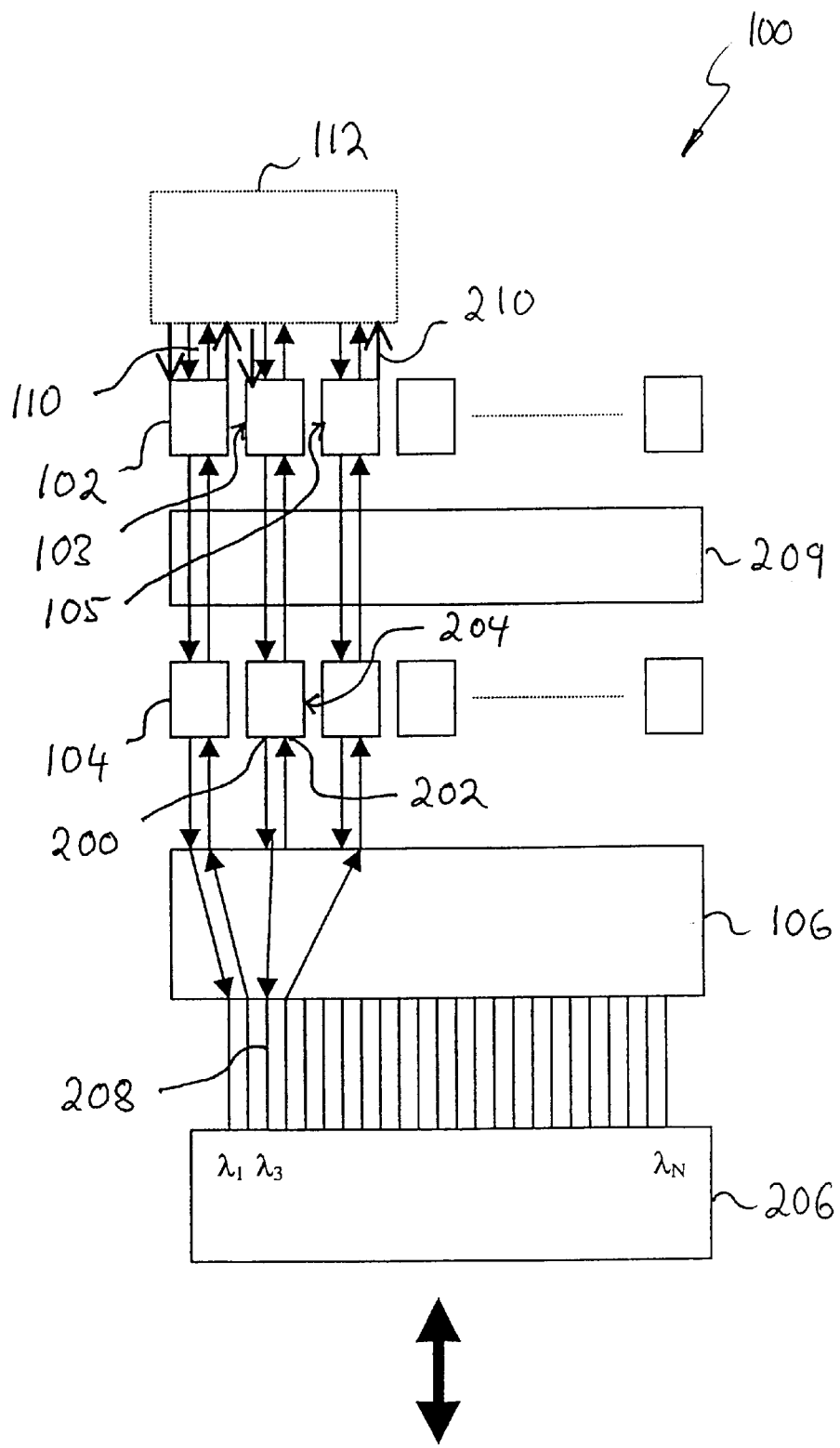
FIG. 2 is a schematic diagram illustrating the network element of FIG. 1 in a different communication configuration.

If that is desired, one way of effecting such symmetric bandwidth allocation would be to switch the connection between one of the channel connections 208 of the WDM unit 206 and the receiver port 202 of the trunk line interface card 204 to the transmitter port 200 of that trunk line interface card 204. This configuration is shown in FIG. 2.

In this embodiment, this flexibility does not require any additional WDM channel resources, where the trunk laser (not shown) at the transmitter port 200 is set to the wavelength $\lambda 3$ associated with the channel connection 208 of the effective wavelength independent transmission directions.

By providing the capability of reversing the transmission direction within the network element 100 and the associated WDM network, each data signal carrying wavelength within an optical network does no longer have to have a predetermined transmission direction. Rather, each wavelength can be transmission-direction-independent, thereby enabling a dynamic asymmetric bandwidth provisioning within the optical network.

It will be appreciated by the person skilled in the art that numerous variations and/or modifications may be made to the present invention as shown in the specific embodiments without departing from the spirit or scope of the invention as broadly described. The present embodiments are, therefore, to be considered in all respects to be illustrative and not restrictive.

What is claimed is:

1. An optical network element comprising:
   a plurality of subscriber line connections,
   a WDM unit having a plurality of WDM channel connections,
   a plurality of subscriber line interface cards and a plurality of trunk line interface cards for optical interfacing between the subscriber line connections and the WDM channel connections, and
   a switch arranged, in use, in a manner such as to be capable of switching transmission directions between the WDM channel connections and individual ones of the subscriber line connections by suitable switching of an optical path configuration between transmitter ports and receiver ports of the subscriber line interface cards and the WDM channel connections.

2. A network element as claimed in claim 1, wherein pairs of one subscriber line interface card and one trunk line interface card is implemented on respective single cards.

3. A network element as claimed in claim 1 or 2, wherein the switch is disposed between transmitter and receiver ports of the trunk line interface cards on the WDM side thereof and the WDM channel connections and is arranged in a manner such that, in use, the transmission directions are switched by suitable switching of the connectivity between said transmitter and receiver ports of the trunk line interface cards and the WDM channel connections.

4. A network element as claimed in claim 1, wherein the switch comprises an optical patch panel arranged, in use, to manually switch said connectivity.

5. A network element as claimed in claim 1, wherein the switch is automated.

6. A network element as claimed in claim 5, wherein the automated switch is an automated optical switch.

7. An optical network element comprising a plurality of full-duplex subscriber line connections, each having transmission direction channels, a WDM unit having a plurality of WDM channel connections, a plurality of trunk line interface cards for optical interfacing between the full-duplex subscriber line connections and the WDM channel connections, and a switch coupled to the trunk line interface cards, the network element being arranged in a manner such that only the active transmission direction channels of the full-duplex subscriber line connections are, in use, connected to the WDM channel connections.

8. An optical network element comprising:
   a plurality of subscriber line connections, each being capable of supporting one or more transmission directions,
   a WDM unit having a plurality of WDM channel connections,
   a plurality of trunk line interface cards for optical interfacing between the subscriber line connections and the WDM channel connections, and
   a switch coupled to the trunk line interface cards,
   the network element being arranged in a manner such that, in use, the transmission directions with respect to transmissions to and from the subscriber line connections are wavelength independent.

9. The optical network element as claimed in claim 8, wherein the switch enables the transmission direction of a wavelength to be changed between directions to and from the subscription line connections.

10. An optical network having a plurality of subscriber line connections, each being capable of supporting one or more transmission directions, a plurality of trunk line interface cards for optical interfacing of the subscriber line connections, and a switch coupled to the subscriber line connections, the network being arranged in a manner such that, in use, the transmission directions with respect to transmissions to and from the subscriber line connections are wavelength independent.

11. An optical network as claimed in claim 10, wherein the optical network incorporates an optical network element comprising the plurality of subscriber line connections and a WDM unit having a plurality of WDM channel connections, the network element being arranged in a manner such that, in use, the transmission directions with respect to transmissions to and from the subscriber line connections are wavelength independent.

12. The optical network element as claimed in claim 10, wherein the switch enables the transmission direction of a wavelength to be changed between directions to and from the subscription line connections.

13. A method of switching transmission directions between WDM channel connections and individual ones of a plurality of subscriber line connections of an optical network element, the method comprising the step of switching an optical path configuration between transmitter ports and receiver ports of subscriber line interface cards of the network element and the WDM channel connections.

* * * * *